United States Patent
Graham et al.

(10) Patent No.: US 6,519,718 B1
(45) Date of Patent: Feb. 11, 2003

(54) METHOD AND APPARATUS IMPLEMENTING ERROR INJECTION FOR PCI BRIDGES

(75) Inventors: Charles Scott Graham, Rochester, MN (US); Kevin Dale Jones, Rochester, MN (US); Daniel Frank Moertl, Rochester, MN (US); Adalberto Guillermo Yanes, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/506,783

(22) Filed: Feb. 18, 2000

(51) Int. Cl.[7] ................................................. H04L 1/24
(52) U.S. Cl. ............................ 714/41; 714/43; 714/32
(58) Field of Search ........................... 714/41, 43, 819, 714/25, 32, 33, 742, 736

(56) References Cited

U.S. PATENT DOCUMENTS

| | | | |
|---|---|---|---|
| 4,999,837 A | * 3/1991 | Reynolds et al. | 714/10 |
| 5,001,712 A | * 3/1991 | Splett et al. | 714/41 |
| 5,790,870 A | * 8/1998 | Hausauer et al. | 710/260 |
| 6,049,894 A | * 4/2000 | Gates | 714/30 |
| 6,134,684 A | * 10/2000 | Baumgartner et al. | 714/724 |
| 6,182,248 B1 | * 1/2001 | Armstrong et al. | 714/43 |
| 6,304,984 B1 | * 10/2001 | Neal et al. | 710/5 |

OTHER PUBLICATIONS

IBM Technical Disclosure Bulletin. SPD I/O Bus Error Injector and Detector. Apr. 1988. vol. 30, Issue No. 11, pp. 12–15.*

IBM Technical Disclosure Bulletin. SPD I/O Bus Interactive. Jun. 1989. vol. 32, Issue No. 1, pp. 56–59.*

* cited by examiner

Primary Examiner—Robert Beausoleil
Assistant Examiner—Yolanda L. Wilson
(74) Attorney, Agent, or Firm—Joan Pennington

(57) ABSTRACT

A method and apparatus are provided for implementing error injection for peripheral component interconnect (PCI) bridges. The apparatus for implementing error injection for peripheral component interconnect (PCI) bridges includes a plurality of PCI busses and a control logic coupled to the plurality of PCI busses. The control logic targets a selected bus of the plurality of PCI busses. A hit is detected on the selected bus. Responsive to the detected hit, an error is injected on the selected bus. For a detected hit for predefined bug types, the operation must match a selected read or write, target or master, command type and the address must match unmasked address bits. For a detected hit for another predefined bug type, the PCI data bus must also match an unmask data register.

15 Claims, 7 Drawing Sheets

BUG INJECTOR CONTROL REGISTER 400

MSB (31)
LSB (00)

| Bits | NAME | DESCRIPTION | TYPE |
|---|---|---|---|
| 31 | HIT DETECTED | HARDWARE SETS THIB BIT TO 1b AND RESETS BIT 30 AFTER CONDITIONS LISTED IN THESE REGISTERS HAS BEEN MET AND THE BUG HAS BEEN INJECTED ON SELECTED PCI BUS | R/W |
| 30 | ENABLE | FIRMWARE SETS BIT TO 1b TO ENABLE BUG INJECTION LOGIC & 0b FOR DISABLE. SET TO 0b AFTER FIRST HIT. | R/W |
| 29 | READ | WHEN 1b THE PCI COMMAND MUST BE A READ TO CAUSE A HIT, WHEN 0b, THE COMMAND MUST BE A WRITE | R/W |
| 28 | TARGET | WHEN 1b THE PCI COMMAND MUST TARGET BRIDGE CHIP, WHEN 0b, BRIDGE CHIP MUST BE THE MASTER OF THE COMMAND THAT CAUSED THE HIT | R/W |
| 27:24 | SLOT NUMBER | THIS IS THE PCI BUS THAT IS BEING MONITORED FOR THE HIT AND THAT WILL HAVE THE BUG INJECTED ONTO IF THERE IS A HIT | R/W |
| 23:22 | COMMAND TYPE | THIS IS THE PCI OPERATION THAT WILL CAUSE A HIT | R/W |
| 21:20 | BUG TYPE | THIS IS THE TYPE OF BUG THAT WILL BE INJECTED ON A HIT; 00b, 01b, 10b, 11b | R/W |
| 19:0 | RESERVED | RESERVED = 0b | R |
| POWER ON RESET: 00000000 00000000 00000000 00000000b | | | |

FIG. 4

BUG INJECTOR ADDRESS MASK 500

MSB (31)
LSB (00)

| Bits | NAME | DESCRIPTION | TYPE |
|---|---|---|---|
| 31:24 | RESERVED | RESERVED=0b | R |
| 23:2 | ADDRESS MASK | 0b ENABLES THIS CORRESPONDING BIT IN THE LOW ORDER ADDRESS REGISTER TO BE USED TO CALCULATE A HIT. 1b THIS CORRESPONDING BIT IN THE LOW ORDER ADDRESS REGISTER IS IGNORED ON THE HIT TEST. | R/W |
| 1:0 | RESERVED | RESERVED=0b | R |
| POWER ON RESET: 00000000 00000000 00000000 00000000b | | | |

FIG. 5A

BUG INJECTOR ADDRESS HIGH 502

MSB (31)
LSB (00)

| Bits | NAME | DESCRIPTION | TYPE |
|---|---|---|---|
| 31:0 | ADDRESS HIGH | IF THIS ADDRESS MATCHES THE UPPER 32-BITS OF THE STARTING DAC ADDRESS OF THE PCI COMMAND, THEN THIS MAY BE A HIT | R/W |
| POWER ON RESET: 00000000 00000000 00000000 00000000b | | | |

FIG. 5B

BUG INJECTOR ADDRESS LOW 504

MSB (31)
LSB (00)

| | NAME | DESCRIPTION | TYPE |
|---|---|---|---|
| 31:2 | ADDRESS LOW | IF THE UNMASKED BITS OF THIS ADDRESS MATCH THE LOWER STARTING ADDRESS OF THE PCI COMMAND, THEN THIS MAY BE A HIT. | R/W |
| 1:0 | RESERVED | RESERVED=0b | R |
| POWER ON RESET: 00000000 00000000 00000000 000000000b | | | |

FIG. 5C

BUG INJECTOR DATA MASK 506

MSB (31)
LSB (00)

| | NAME | DESCRIPTION | TYPE |
|---|---|---|---|
| 31:0 | DATA MASK | 0b ENABLES THIS CORRESPONDING BIT IN THE DATA REGISTER TO BE USED TO CALCULATE A HIT. 1b THIS CORRESPONDING BIT IN THE DATA REGISTER IS IGNORED ON THE HIT TEST. | R/W |
| POWER ON RESET: 00000000 00000000 00000000 000000000b | | | |

FIG. 5D

BUG INJECTOR DATA 508

| MSB (31) LSB (00) | NAME | DESCRIPTION | TYPE |
|---|---|---|---|
| 31:0 | DATA | IF THE UNMASKED BITS OF THIS REGISTER MATCH THE DATA BUS (THE ENTIRE DATA BUS FOR A 32-BIT DATA BUS, OR JUST THE LOWER 32 BITS OF A 64-BIT DATA BUS) ON ANY CYCLE OF THE PCI COMMAND, THEN THIS MAY BE A HIT. | R/W |
| POWER ON RESET: 00000000 00000000 00000000 00000000b | | | |

FIG. 5E

METHOD AND APPARATUS IMPLEMENTING ERROR INJECTION FOR PCI BRIDGES

FIELD OF THE INVENTION

The present invention relates to a method and apparatus for implementing error injection for peripheral component interconnect (PCI) bridges.

DESCRIPTION OF THE RELATED ART

A peripheral component interconnect (PCI) local bus system often includes a primary 64-bit PCI bus and multiple, such as eight secondary PCI busses. The PCI local bus is a high performance, 32-bit or 64-bit bus with multiplexed address and data lines. The bus is used as an interconnect mechanism between highly integrated peripheral controller components, peripheral add-in boards, and processor and memory systems. Typically error recovery paths are the most complicated and the hardest to test in system development.

A mechanism is needed for implementing error injection for peripheral component interconnect (PCI) bridges. There is a need for a repeatable method of injecting errors on different PCI busses for PCI bridges. A need exists for a way of injecting PCI bus errors on all PCI busses associated with a PCI bridge.

SUMMARY OF THE INVENTION

A principal object of the present invention is to provide a method and apparatus for implementing error injection for peripheral component interconnect (PCI) bridges. Other important objects of the present invention are to provide such method and apparatus for implementing error injection for peripheral component interconnect (PCI) bridges substantially without negative effect and that overcome many of the disadvantages of prior art arrangements.

In brief, a method and apparatus are provided for implementing error injection for peripheral component interconnect (PCI) bridges. The apparatus for implementing error injection for peripheral component interconnect (PCI) bridges includes a plurality of PCI busses and a control logic coupled to the plurality of PCI busses. The control logic targets a selected bus of the plurality of PCI busses. A hit is detected on the selected bus. Responsive to the detected hit, an error is injected on the selected bus.

In accordance with features of the invention, for a detected hit for predefined bug types, the operation must match a selected read or write, target or master, command type and the address must match unmasked address bits. For a detected hit for another predefined bug type, the PCI data bus must also match an unmask data register.

BRIEF DESCRIPTION OF THE DRAWINGS

The present invention together with the above and other objects and advantages may best be understood from the following detailed description of the preferred embodiments of the invention illustrated in the drawings, wherein:

FIG. 4 is a diagram illustrating a bug injector control register in accordance with the preferred embodiment; and FIGS. 5A, 5B, 5C, 5D, and 5E are diagrams illustrating control registers in accordance with the preferred embodiment.

DETAILED DESCRIPTION OF THE PREFERRED EMBODIMENTS

Figure 1:
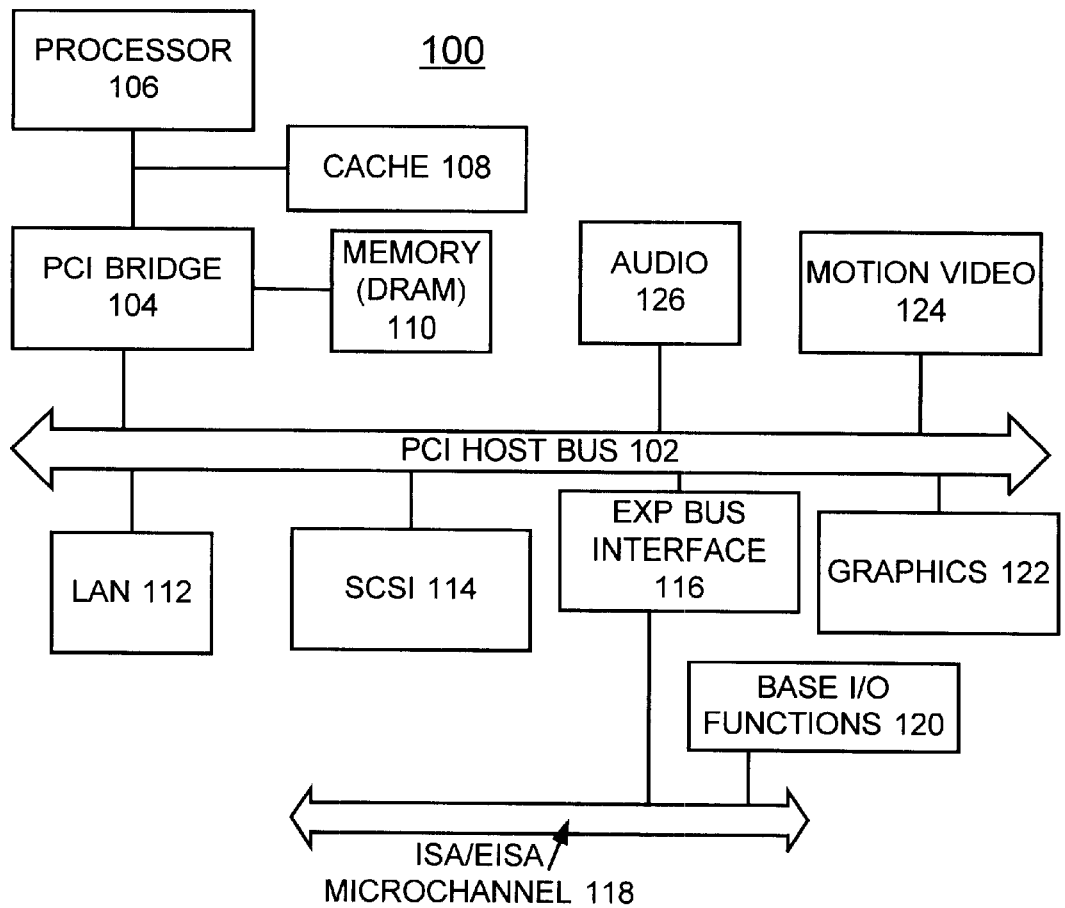
FIG. 1 is a block diagram representation illustrating a peripheral component interconnect (PCI) local bus system for implementing methods for implementing error injection for peripheral component interconnect (PCI) bridges in accordance with the preferred embodiment.

Having reference now to the drawings, in FIG. 1, there is shown a peripheral component interconnect PCI local bus system of the preferred embodiment generally designated by the reference character 100. Peripheral component interconnect PCI local bus system 100 includes a PCI host bus 102. As shown in FIG. 1, peripheral component interconnect PCI local bus system 100 includes a PCI bridge 104 coupled to a processor 106, a cache 108 and a dynamic random access memory (DRAM) 110. A local area network (LAN) 112, a small computer system interface (SCSI) 114, and an expansion bus interface 116 connected to an ISA/EISA microchannel 118. Base I/O functions block 120 is coupled to the ISA/EISA microchannel 118. A graphics card 122, a motion video card 124 and an audio card 126 are supported by PCI host bus 102. It should be understood that the present invention is not limited to a particular computer model or the architecture as shown in FIG. 1. Various commercially available PCI local bus systems can be used for PCI local bus system 100.

Figure 2:
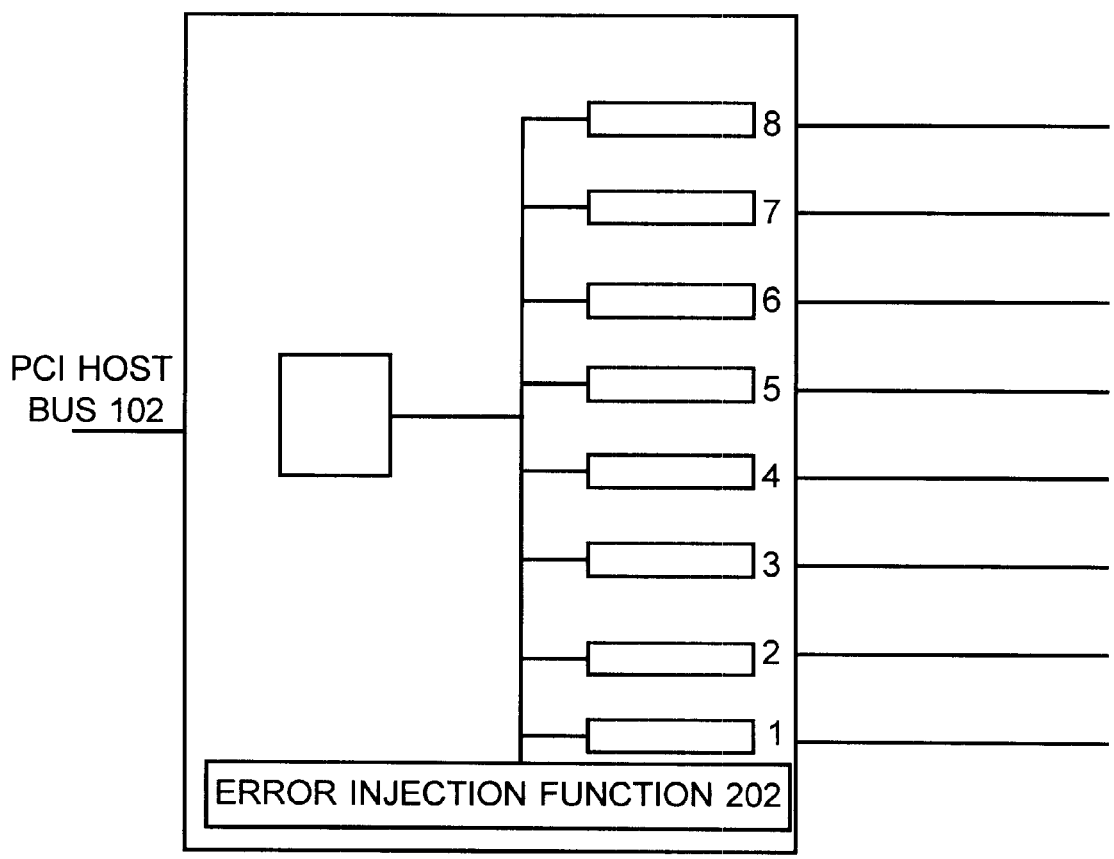
FIG. 2 is a block diagram representation illustrating a PCI bridge with an error injection function in accordance with the preferred embodiment.

FIG. 2 illustrates a PCI bridge 200 with an error injection function 202 in accordance with the preferred embodiment. Error injection function 202 monitors a PCI bus that has been selected and injects an error with error injection function 202 based on controls. As shown in FIG. 2, error injection function 202 is used with a PCI host bus 102 and a plurality of secondary PCI busses 1–8.

In accordance with features of the invention, error injection function 202 comprises minimal hardware for injecting different PCI bus errors on all PCI busses associated with the PCI bridge with the error injection function 202. PCI bridge chip integrated with the error injection function 202 does not require external hardware to create the different PCI bus errors in system level testing. Specific paths are tested by setting the error injection function 202 to trigger firmware paths that need to be tested. Once a fix is provided, the exact same error is recreated to ensure that the specific fix has been validated. Error injection function 202 forces single error events on the PCI busses. Error injection function 202 is used in system test to verify error recovery procedure (ERP) firmware and field replaceable unit (FRU) callouts. One set of control logic is provided. The control logic can target any of the 9 PCI busses. When a hit is detected, the error is then injected and the bug injection logic enable is cleared.

Figure 3:
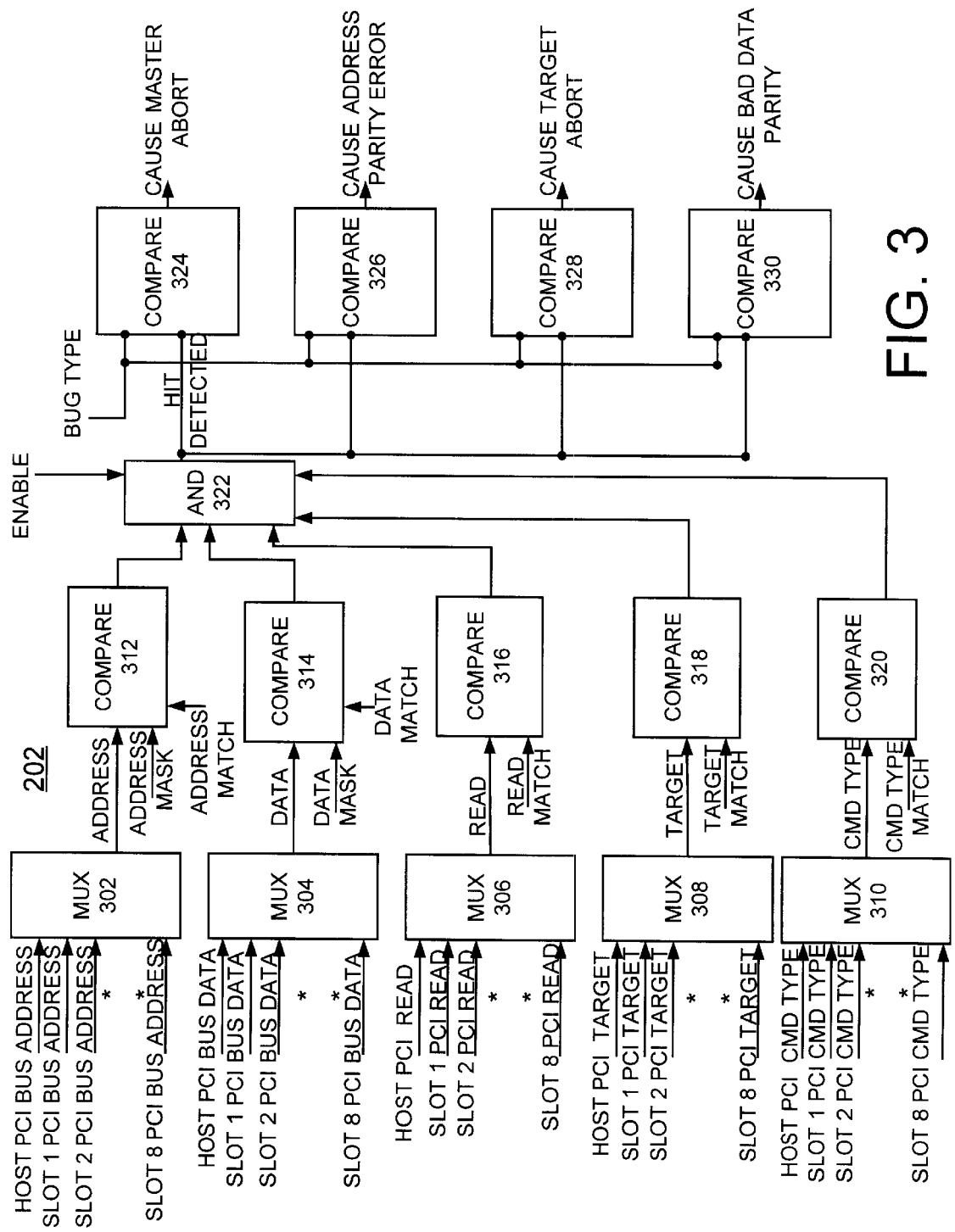
FIG. 3 is a schematic diagram representation illustrating a PCI bridge with an error injection function in accordance with the preferred embodiment.

FIG. 3 illustrates the error injection function 202 in accordance with the preferred embodiment. Error injection function 202 includes a plurality of multiplexers (MUXs) 302, 304, 306, 308, and 310. Host PCI bus address and slot 1–8 PCI bus address are applied to MUX 302. MUX 302 provides an address output applied to a compare 312. An address mask and an address match are applied to the compare 312. Host PCI bus data and slot 1–8 PCI bus data are applied to MUX 304. MUX 304 provides a data output applied to a compare 314. A data mask and a data match are applied to the compare 314. Host PCI bus read and slot 1–8 PCI bus read are applied to MUX 306. MUX 306 provides a read output applied to a compare 316. A read match is applied to the compare 316. Host PCI bus target and slot 1–8 PCI bus target are applied to MUX 308. MUX 308 provides a target output applied to a compare 318. A target match is applied to the compare 318. Host PCI bus command type and slot 1–8 PCI bus command type are applied to MUX 310. MUX 310 provides a command type output applied to a compare 320. A command type match is applied to the compare 320. An enable input and outputs of compares 312, 314, 316, 318 and 320 are applied to an AND gate 322. AND gate 322 provides an output HIT DETECTED. A bug type input and the HIT DETECTED output of AND gate 322 are applied to a plurality of compares 324, 326, 328 and 330. Compare 324 provides an output CAUSE MASTER ABORT. Compare 326 provides an output CAUSE ADDRESS PARITY ERROR. Compare 328 provides an output CAUSE TARGET ABORT. Compare 330 provides an output CAUSE BAD DATA PARITY.

In operation, error injection function 202 loads the control registers and sets the enable bit. Error injection function 202 detects a cycle that matches the registers causing a hit. The hit occurs on the selected bus. The operation must match the selected read/write, command type, and the address must match the unmasked address bits. This would be a hit for bug types 00, 01, 10. In addition, for a hit on bug type 11, the PCI data bus must also match the unmask data register. Then error injection function 202 injects the requested bug. Error injection function 202 resets the enable bit and sets the hit bit.

A bug injector control register 400 of FIG. 4, a bug injector address mask register 500 of FIG. 5A, a bug injector address high register 502 of FIG. 5B, a bug injector address low register 504 of FIG. 5C, a bug injector data mask register 506 of FIG. 5D, and a bug injector data register 508 of FIG. 5E are needed for this bug injector function.

FIG. 4 illustrates the bug injector control register 400 of the preferred embodiment. As shown, a bit definition for the bug injector control register 400 includes bit 31 hit detected; bit 30 enable; bit 29 read; bit 28 target; bits 27:24 slot number; bits 23:22 command type and bits 21:20 bug type. The bit 31 hit detected bit is set to 1 b and bit 30 enable is reset after the conditions listed in these registers have been met and the bug has been injected on the selected PCI bus. Bit 30 enable is set to 1 b to enable this bug injection logic and is set to 0 b for disabling the function after the first hit. When bit 29 read is 1 b, the PCI command must be a read to cause a hit; when 0 b the command must be a write. When bit 28 target is 1 b the PCI command must target the bridge chip; when 0 b, the bridge chip must be the master of the command that caused the hit. Bits 27:24 slot number is the PCI bus that is being monitored for the hit and that will have the bug injected onto it when there is a hit. Bits 27:24 are defined as follows:

0000 =Slot 0 primary
0001 =Secondary slot 1
0010 =Secondary slot 2
0011 =Secondary slot 2
0100 =Secondary slot 4
0101 =Secondary slot 5
0110 =Secondary slot 6
0111 =Secondary slot 7
1000 =Secondary slot 8

Bits 23:22 command type is the PCI operation that will cause a hit. Bits 23:22 are defined as follows:

00 =I/O cycle
01 =memory cycle
10 =configure cycle
11 =reserved

Bits 21:20 bug type is the type of bug that will be injected on a hit including 00 b CAUSE MASTER ABORT if a target. This is not used if a master. Data compare is not used to determine the hit. 01 b CAUSE ADDRESS PARITY ERROR;hardware pretends it saw an address parity error if a target, hardware will master abort. Hardware drives bad address parity if a master. Data compare is not used to determine the hit. 10 b CAUSE TARGET ABORT, hardware target aborts the first access if a target. This is not used if a master. Data compare is not used to determine the hit. 11 b CAUSE BAD DATA PARITY; hardware pretends it saw bad data parity, for a target write or master read or hardware drives bad data parity, for a master write or target read. Data compare is used, if unmasked, to determine the hit. The data mask register must be used to cause bad parity to be inserted when the bridge chip is the master.

FIG. 5A illustrates the bug injector address mask register 500 of the preferred embodiment. As shown, a bit definition for the bug injector address mask register 500 includes bits 23:2 address mask. The bug injector address mask register 500 is used to prevent some address bits from being used to calculate a hit. 0 b enables this corresponding bit in the low order address register to be used to calculate a hit. With 1 b this corresponding bit in the low order address register is ignored on the hit test.

FIG. 5B illustrates the bug injector address high register 502 of the preferred embodiment. As shown, a bit definition for the bug injector address high register 502 includes bits 31:0 address high that is used to calculate a hit. If this address matches the upper 32-bits of the starting DAC address of the PCI command, then this may be a hit.

FIG. 5C illustrates the bug injector address low register 504 of the preferred embodiment. As shown, a bit definition of the bug injector address low register 504 includes bits 31:2 address low that is used to calculate a hit. If the unmasked bits of this address match the lower starting address of the PCI command, then this may be a hit.

FIG. 5D illustrates the bug injector data mask register 506 of the preferred embodiment. As shown, a bit definition of the bug injector data mask register 506 includes bits 31:0 data mask that is used to prevent some data bits from being used to calculate a hit. 0 b enables this corresponding bit in the data register to be used to calculate a hit. With 1 b, this corresponding bit in the data register is ignored on the hit test.

FIG. 5E illustrates the bug injector data register 508 of the preferred embodiment. As shown, a bit definition of the bug injector data register 508 includes bits 31:0 data that is the data used to calculate a hit. If the unmasked bits of this register match the data bus, the entire data bus for a 32-bit data bus, or the lower 32-bits of a 64-bit data bus, on any cycle of the PCI command, then this may be a hit.

While the present invention has been described with reference to the details of the embodiments of the invention shown in the drawing, these details are not intended to limit the scope of the invention as claimed in the appended claims.

What is claimed is:

1. Apparatus for implementing error injection for peripheral component interconnect (PCI) bridges comprising:
   a plurality of PCI busses;
   a control logic coupled to said plurality of PCI busses; said control logic for targeting a selected bus of said plurality of PCI busses; for detecting a hit on said selected bus; and responsive to said detected hit, for injecting an error on said selected bus.

2. Apparatus for implementing error injection for peripheral component interconnect (PCI) bridges as recited in claim 1 wherein said control logic includes a plurality of multiplexers, each said multiplexer having a plurality of inputs respectively coupled to said plurality of PCI busses.

3. Apparatus for implementing error injection for peripheral component interconnect (PCI) bridges as recited in claim 2 wherein said control logic includes a plurality of compares respectively coupled to predefined ones of said plurality of multiplexers.

4. Apparatus for implementing error injection for peripheral component interconnect (PCI) bridges as recited in claim 3 wherein one of said compares is arranged to identify a match of a multiplexer address output and unmasked address bits.

5. Apparatus for implementing error injection for peripheral component interconnect (PCI) bridges as recited in claim 3 wherein one of said compares is arranged to identify a match of a multiplexer data output and unmasked data bits.

6. Apparatus for implementing error injection for peripheral component interconnect (PCI) bridges as recited in claim 3 wherein said control logic includes a bug type input.

7. Apparatus for implementing error injection for peripheral component interconnect (PCI) bridges as recited in claim 3 wherein said control logic includes an enable input.

8. Apparatus for implementing error injection for peripheral component interconnect (PCI) bridges as recited in claim 1 wherein said control logic includes a bug injector control register used to enable the injection of an error.

9. Apparatus for implementing error injection for peripheral component interconnect (PCI) bridges as recited in claim 1 wherein said control logic includes a bug injector address mask used to prevent defined address bits from being used to identify said hit on said selected bus.

10. Apparatus for implementing error injection for peripheral component interconnect (PCI) bridges as recited in claim 1 wherein said control logic includes a bug injector address high used to identify said hit on said selected bus.

11. Apparatus for implementing error injection for peripheral component interconnect (PCI) bridges as recited in claim 1 wherein said control logic includes a bug injector address low used to identify said hit on said selected bus.

12. Apparatus for implementing error injection for peripheral component interconnect (PCI) bridges as recited in claim 1 wherein said control logic includes a bug injector data mask used to prevent defined data bits from being used to identify said hit on said selected bus.

13. Apparatus for implementing error injection for peripheral component interconnect (PCI) bridges as recited in claim 1 wherein said control logic includes a bug injector data used to identify said hit on said selected bus.

14. A method for implementing error injection for peripheral component interconnect (PCI) bridges comprising the steps of:
    utilizing a control logic coupled to a plurality of PCI busses; said control logic performing the steps of:
    targeting a selected bus of said plurality of PCI busses;
    detecting a hit on said selected bus; and
    responsive to said detected hit, injecting an error on said selected bus.

15. A method for implementing error injection for peripheral component interconnect (PCI) bridges as recited in claim 14 further includes the step of clearing said control logic responsive to injecting said error on said selected bus.

* * * * *